(12) United States Patent
Vaddiraju

(10) Patent No.: US 11,731,532 B2
(45) Date of Patent: Aug. 22, 2023

(54) SELECTIVE THERMAL MECHANIZATION FOR RESS HEAT LOADS

(71) Applicant: GM GLOBAL TECHNOLOGY OPERATIONS LLC, Detroit, MI (US)

(72) Inventor: Srinivasa Rao Vaddiraju, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 379 days.

(21) Appl. No.: 17/142,347

(22) Filed: Jan. 6, 2021

(65) Prior Publication Data

US 2022/0212566 A1 Jul. 7, 2022

(51) Int. Cl.
*B60L 58/26* (2019.01)
*H01M 10/625* (2014.01)
*H01M 10/635* (2014.01)
*H01M 10/613* (2014.01)

(52) U.S. Cl.
CPC ........... *B60L 58/26* (2019.02); *H01M 10/613* (2015.04); *H01M 10/625* (2015.04); *H01M 10/635* (2015.04); *B60L 2250/18* (2013.01); *H01M 2220/20* (2013.01)

(58) Field of Classification Search
CPC .................. B60L 58/26; B60L 2250/18; B60L 2240/545; B60L 1/02; H01M 10/613; H01M 10/625; H01M 10/635; H01M 2220/20; H01M 10/6567
See application file for complete search history.

(56) References Cited

FOREIGN PATENT DOCUMENTS

WO WO-2011083976 A2 * 7/2011 ......... B60H 1/00278

* cited by examiner

*Primary Examiner* — Jacob M Amick
*Assistant Examiner* — Charles J Brauch
(74) *Attorney, Agent, or Firm* — Quinn IP Law

(57) ABSTRACT

A method is usable for cooling portions of a vehicle having a plurality of low temperature radiators (LTR), a rechargeable energy storage system (RESS), an i-condenser coolant circuit, and a RESS coolant circuit. Cooling the RESS occurs by comparing ambient temperature to target low and high temperatures. If the ambient temperature is below the target low temperature, coolant flow is routed through a first flow path placing the first and second LTR in the RESS coolant circuit. If the ambient temperature is between the target low and high temperatures, coolant flow is routed through a second flow path placing the first LTR in the RESS coolant circuit and the second LTR in the i-condenser coolant circuit. If the ambient temperature is above the target high temperature, coolant flow is routed through a third flow path placing the first and second LTR in the i-condenser coolant circuit.

9 Claims, 4 Drawing Sheets

SELECTIVE THERMAL MECHANIZATION FOR RESS HEAT LOADS

INTRODUCTION

The present disclosure relates to mechanisms and assemblies selectively cooling heat loads from rechargeable energy storage systems (RESS), such as for electric vehicles.

SUMMARY

A vehicle and method for cooling portions of the vehicle are provided. The vehicle includes a plurality of low temperature radiators (LTR), a plurality of valves, and a rechargeable energy storage system (RESS). The vehicle also includes an i-condenser, or indirect condenser, coolant circuit and a RESS coolant circuit. A controller is configured to control the valves to route coolant flow, and to compare ambient temperature to a target low temperature and a target high temperature.

The RESS may be selectively cooled by comparing ambient temperature to the target low temperature and the target high temperature. If the ambient temperature is below the target low temperature, coolant flow is routed through a first flow path that places a first LTR and a second LTR in the RESS coolant circuit. If the ambient temperature is between the target low temperature and the target high temperature, coolant flow is routed through a second flow path that places the first LTR in the RESS coolant circuit and the second LTR in the i-condenser coolant circuit. If the ambient temperature is above the target high temperature, coolant flow is routed through a third flow path that places the first LTR and the second LTR in the i-condenser coolant circuit. The i-condenser coolant circuit may also pass through a third LTR.

In some configurations, the first LTR is a first LTR set having at least two LTR, the second LTR is a second LTR set having at least two LTR, and the third LTR is a third LTR set having at least two LTR. Additionally, each of the LTR sets may be aligned in parallel relative to coolant flow.

The controller may also determine a driving aggressiveness level. From that aggressiveness level, or from coolant temperatures at the RESS, the controller may adjust the target low temperature and the target high temperature, such that there is, at least, a racing target low temperature and a racing target high temperature, and a continuous target low temperature and a continuous target high temperature. The continuous target low temperature is lower than the racing target low temperature, and the continuous target high temperature is lower than the racing target high temperature.

The above features and advantages and other features and advantages of the present disclosure are readily apparent from the following detailed description of the best modes for carrying out the disclosure when taken in connection with the accompanying drawings.

DETAILED DESCRIPTION

Figure 1:
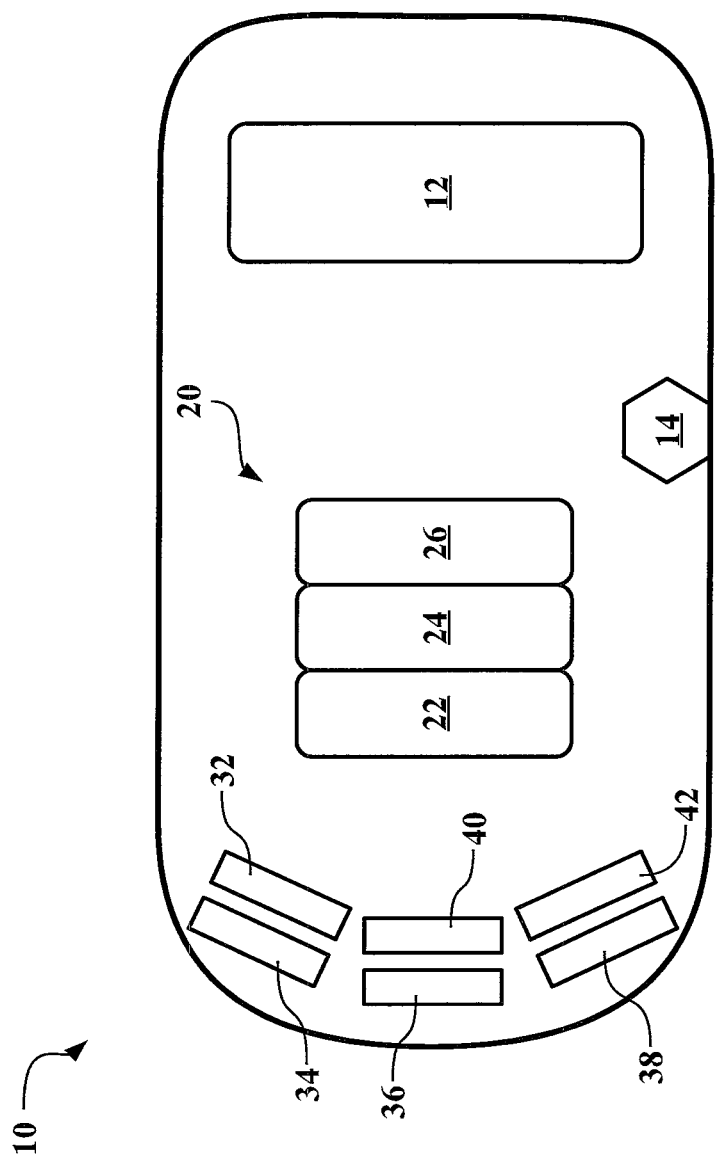
FIG. 1 is a schematic diagram of a vehicle having one or more RESS, one or more cooling circuits, and one or more low temperature radiators (LTR).

Referring to the drawings, like reference numbers refer to similar components, wherever possible. FIG. 1 schematically illustrates a vehicle 10, shown highly schematically, which may be, for example and without limitation, an electric or hybrid-electric vehicle. The vehicle 10 includes a rechargeable energy storage system (RESS) 12, which may include, for example and without limitation, a rechargeable battery or rechargeable battery pack.

A control system or controller 14 is operatively in communication with all necessary components of the vehicle 10. The controller 14 includes a non-generalized, electronic control device having a preprogrammed digital computer or processor, a memory or non-transitory computer readable medium used to store data such as control logic, instructions, lookup tables, etc., and a plurality of input/output peripherals, ports, or communication protocols. The controller 14 is configured to implement or execute the control logic or instructions described herein.

Furthermore, the controller 14 may include, or be in communication with, a plurality of sensors, including, without limitation, those configured to sense or estimate ambient temperature outside of the vehicle 10 and various coolant temperatures within the vehicle 10. The controller 14 may be dedicated to the specific aspects of the vehicle 10 described herein, or the controller 14 may be part of a larger control system that manages numerous functions of the vehicle 10.

The drawings and figures presented herein are diagrams, are not to scale, and are provided purely for descriptive purposes. Thus, any specific or relative dimensions or alignments shown in the drawings are not to be construed as limiting. While the disclosure may be illustrated with respect to specific applications or industries, those skilled in the art will recognize the broader applicability of the disclosure. Those having ordinary skill in the art will recognize that terms such as "above," "below," "upward," "downward," et cetera, are used descriptively of the figures, and do not represent limitations on the scope of the disclosure, as defined by the appended claims. Any numerical designations, such as "first" or "second" are illustrative only and are not intended to limit the scope of the disclosure in any way.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

All numerical values of parameters (e.g., of quantities or conditions) in this specification, including the appended claims, are to be understood as being modified in all instances by the term about whether or not the term actually appears before the numerical value. About indicates that the stated numerical value allows some slight imprecision (with some approach to exactness in the value; about or reasonably close to the value; nearly). If the imprecision provided by about is not otherwise understood in the art with this ordinary meaning, then about as used herein indicates at least variations that may arise from ordinary methods of measuring and using such parameters. In addition, disclosure of ranges includes disclosure of all values and further divided ranges within the entire range. Each value within a range and the endpoints of a range are hereby all disclosed as separate embodiments.

When used herein, the term "substantially" refers to relationships that are ideally perfect or complete, but where manufacturing realties prevent absolute perfection. Therefore, substantially denotes typical variance from perfection. For example, if height A is substantially equal to height B, it may be preferred that the two heights are 100.0% equivalent, but manufacturing realities likely result in the distances varying from such perfection. Skilled artisans will recognize the amount of acceptable variance. For example, and without limitation, coverages, areas, or distances may generally be within 10% of perfection for substantial equivalence. Similarly, relative alignments, such as parallel or perpendicular, may generally be considered to be within 5%.

The vehicle 10 includes an improved cooling system 20 for the RESS 12, in addition to other systems of the vehicle 10. The cooling system 20 includes several low temperature radiators (LTR), many of which are selectively moveable between different cooling circuits. In most configurations, the front of the vehicle 10 will be to the left, as viewed in FIG. 1.

The cooling system 20 includes, at least, a refrigerant circuit 22, a RESS coolant circuit 24, and an i-condenser coolant circuit 26. The refrigerant circuit 22, RESS coolant circuit 24, and i-condenser coolant circuit 26 are illustrated in more detail, including some of the possible flow paths, in the diagrams of FIGS. 2-4. As used herein, the term i-condenser refers, in general, to an indirect condenser or a water-cooled condenser. The i-condenser may be, for example and without limitation, a refrigerant vapor to liquid coolant (i.e., water) heat exchanger, and the i-condenser coolant circuit 26 includes at least one such component, as discussed herein.

The plurality of LTR used by the cooling system 20 may be referred to as radiators and may be combined or grouped to form LTR sets. A first LTR, or first radiator 32, and a second LTR, or second radiator 34, form what may be referred to as a first LTR set 35. A third LTR, or third radiator 36, and a fourth LTR, or fourth radiator 38, form what may be referred to as a second LTR set 39. Similarly, a fifth LTR, or fifth radiator 40, and a sixth LTR, or sixth radiator 42, form what may be referred to as a third LTR set 43. Various fans, conduits, or other structures may be used to selectively control air flow to the various radiators or LTR sets.

Figure 2:
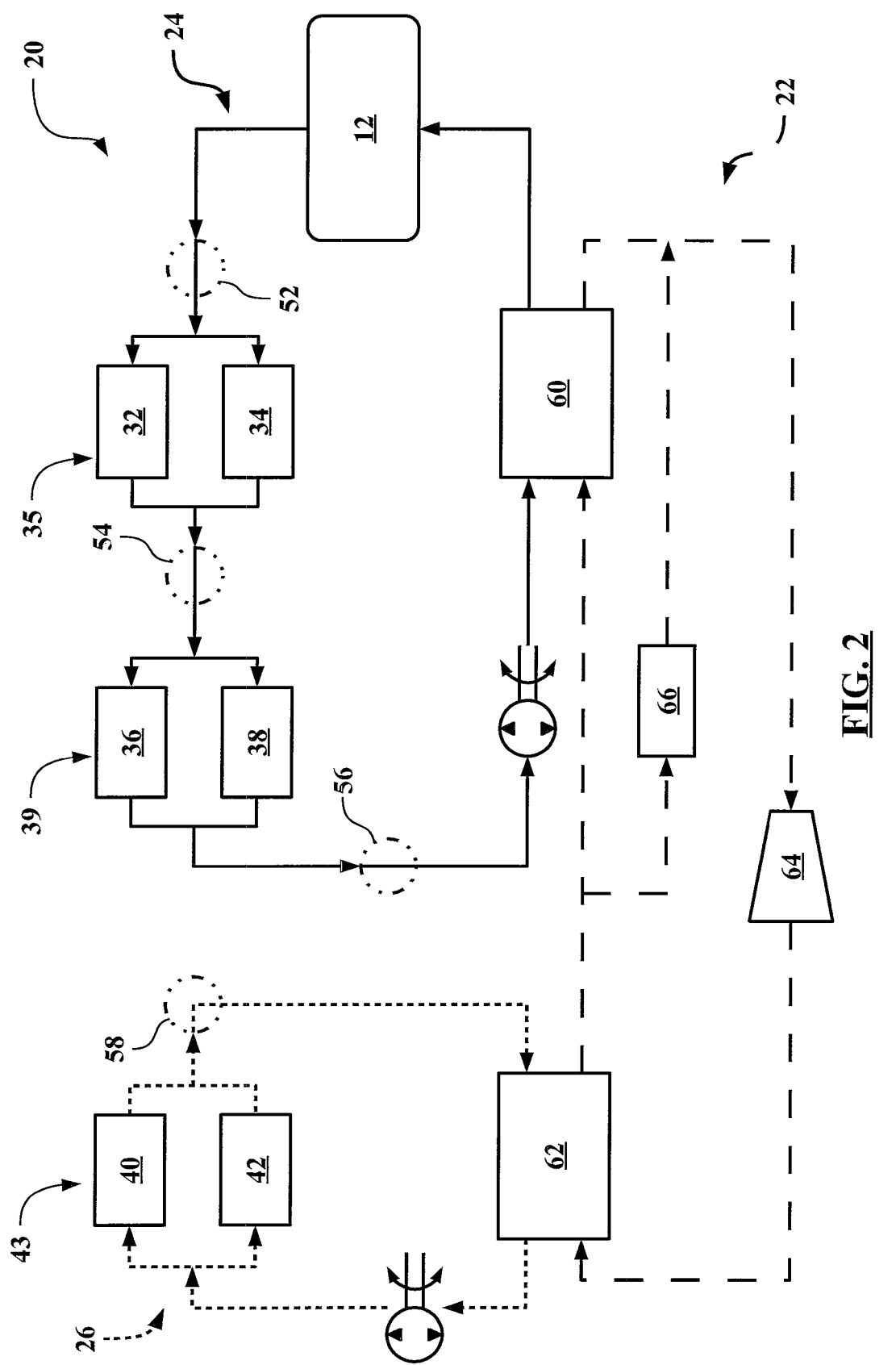
FIG. 2 is a schematic diagram of a first flow path for the cooling circuits of the vehicle.
Figure 3:
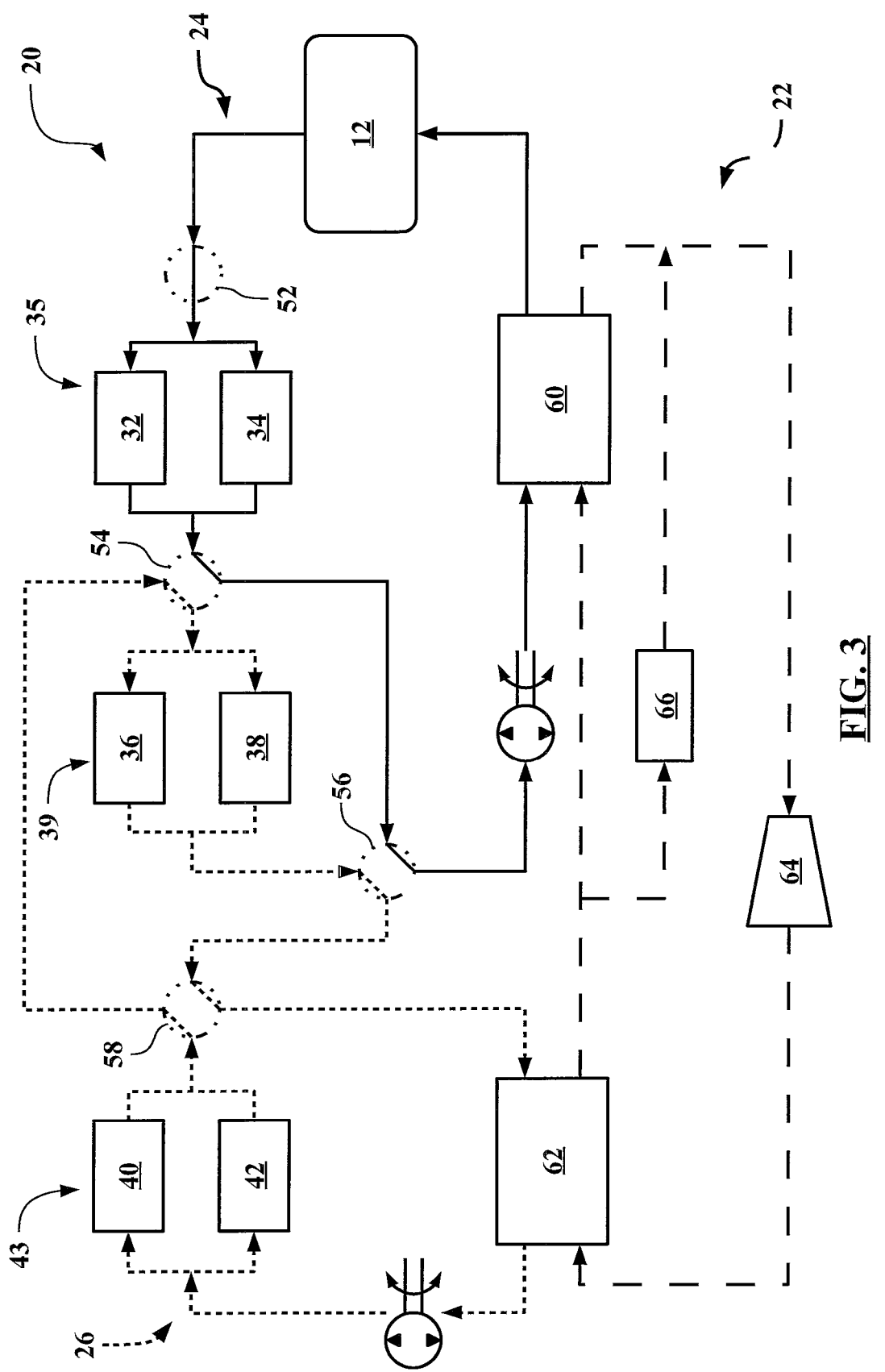
FIG. 3 is a schematic diagram of a second flow path for the cooling circuits of the vehicle.
Figure 4:
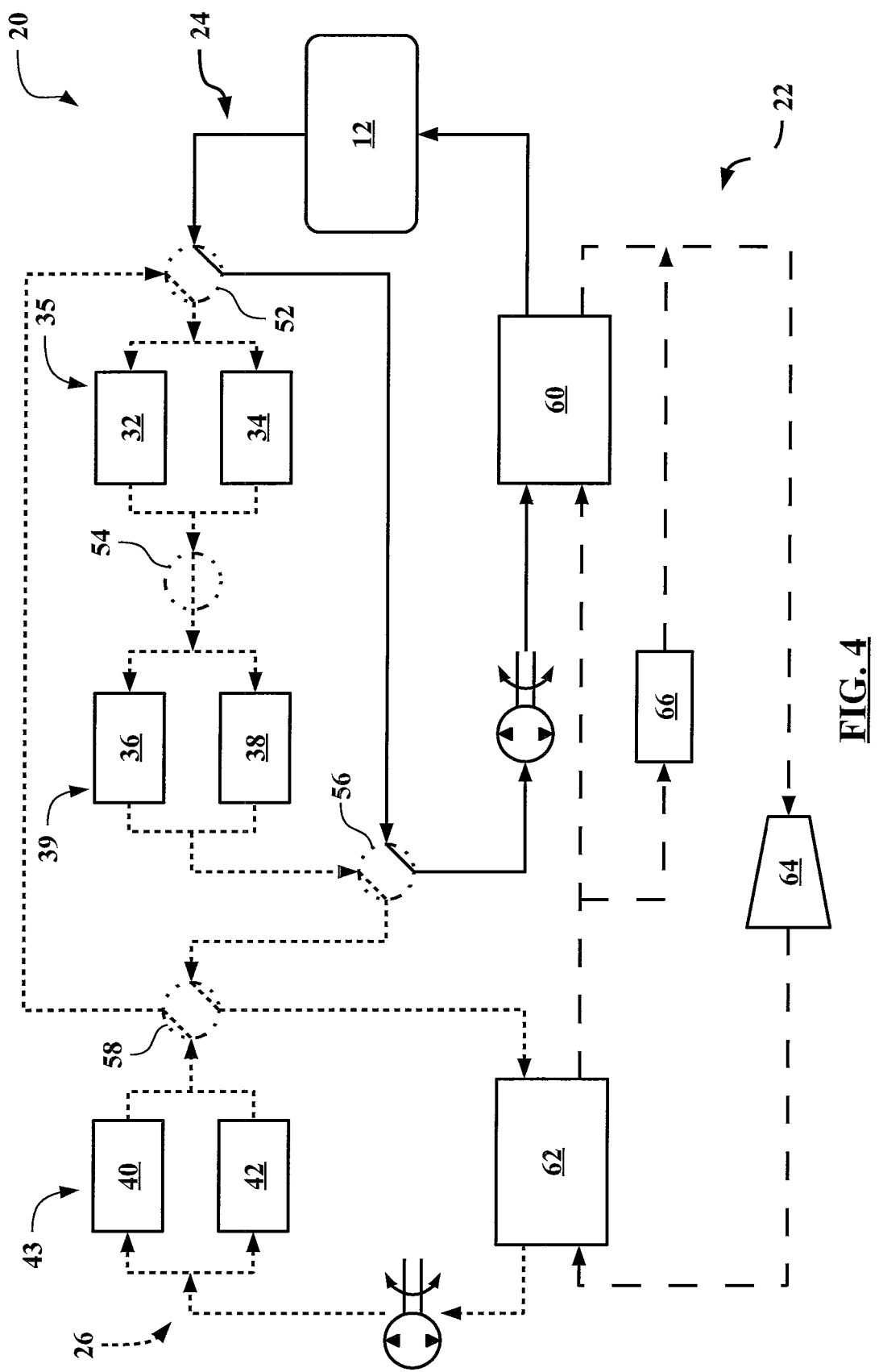
FIG. 4 is a schematic diagram of a third flow path for the cooling circuits of the vehicle.

Referring to FIGS. 2-4, with continued reference to FIG. 1, there are shown schematic diagrams of different flow paths through the cooling system 20, each of which varies the LTR used by the different cooling circuits. FIG. 2 schematically illustrates a first flow path (or flow path 1) for the cooling circuits of the illustrative vehicle 10; FIG. 3 schematically illustrates a second flow path (or flow path 2) for the cooling circuits of the illustrative vehicle 10; and FIG. 4 schematically illustrates a third flow path (or flow path 3) for the cooling circuits of the illustrative vehicle 10. The three flow paths shown in the figures are illustrative only, and skilled artisans will recognize that additional flow paths, and modifications to the those shown, may be used within the scope described herein.

FIGS. 2-4 illustrate various methods or algorithms for cooling the RESS 12, in addition to other components of the vehicle, by selectively changing how the LTR, or LTR sets, are utilized by the vehicle 10 and the cooling system 20. Generally, the functions or methods described herein may be executed in response to commands from the controller 14, which is in communication with the necessary components and able to execute all necessary functions described herein. As discussed herein, selection of the example flow paths may be based on the, for example, and without limitation, temperature of the RESS 12, the ambient temperature, and driving styles or aggressiveness.

As shown in FIGS. 2-4, the cooling system 20 includes several other components, some of which, but not all, are individually numbered or shown. A first valve 52, a second valve 54, third valve 56, and a fourth valve 58 are selectively changed by the controller 14 to route coolant flow through the various LTR or LTR sets. In the schematic diagrams of FIGS. 2-4: flow through the refrigerant circuit 22 is shown with long-dashed lines; flow through the RESS coolant circuit 24 is shown with solid lines; and flow through the i-condenser coolant circuit 26 is shown in with short-dashed lines. Note that the valves are not shown in detail and are illustrated only as examples of switching devices that alter the flow of the coolant—skilled artisans will recognize suitable structures to affect the described functions.

The refrigerant circuit 22 operates as an air conditioner system, such as a heat pump, and includes a chiller 60, which is a refrigerant to coolant heat exchanger. The chiller 60 sits between the RESS coolant circuit 24 and the refrigerant circuit 22. The cooling system 20 also includes one or more pumps, which are shown by pump symbols and are not individually numbered.

An i-condenser 62 sits, and exchanges heat, between the refrigerant circuit 22 and the i-condenser coolant circuit 26. The i-condenser 62 illustrated schematically in FIGS. 2-4 is a refrigerant vapor to liquid coolant heat exchanger. However, the i-condenser 62 may be representative of other heat exchange structures. The i-condenser 62 may operate more efficiently than vapor to air heat exchangers used in some air conditioner system configurations. Not all parts of the refrigerant circuit 22 are separately shown, but skilled artisans will recognize the functioning, components, and operation thereof, including one or more compressors 64 and evaporators 66.

FIG. 2 shows the first flow path as an example method of cooling the RESS 12. The controller 14 may be comparing ambient temperature to a target low temperature and a target high temperature. Where the ambient temperature is below the target low temperature, the controller 14 routes coolant flow through the first flow path.

The first flow path places the first LTR set 35, including the first radiator 32 and the second radiator 34, in the RESS coolant circuit 24. Additionally, the first flow path places the second LTR set 39, including the third radiator 36 and the fourth radiator 38, in the RESS coolant circuit 24.

When the ambient temperature is relatively low, such that it is below the target low temperature, there is a relatively large temperature differential between the coolant flowing out from the RESS 12 and the ambient air. Therefore, significant cooling is achieved by including the first LTR set 35 and the second LTR set 39 in the RESS coolant circuit 24, as illustrated by the solid lines.

After passing through the first LTR set 35 and the second LTR set 39, the coolant of the RESS coolant circuit 24 also passes through the chiller 60, where it is further cooled by the heat pump system of the refrigerant circuit 22. The i-condenser coolant circuit 26 utilizes the third LTR set 43, including the fifth radiator 40 and the sixth radiator 42 to expel heat transferred from the refrigerant circuit 22.

In one operating example illustrated by FIG. 2, where the ambient temperature is below 30 C and the coolant leaving the RESS 12 is approximately 40 C, the first LTR set 35 and the second LTR set 39 may collectively remove up to 40 kW of heat power from the RESS coolant circuit 24. Furthermore, the refrigerant circuit 22, which expels heat energy through the i-condenser coolant circuit 26, may remove up to 30 kW of heat power from the RESS coolant circuit 24 via the chiller 60.

If the ambient temperature is between the target low temperature and the target high temperature, the controller 14 routes coolant flow through the second flow path, as shown in FIG. 3. The second flow path places the first LTR set 35, including the first radiator 32 and the second radiator 34, in the RESS coolant circuit 24. However, the second flow path places the second LTR set 39, including the third radiator 36 and the fourth radiator 38, in the i-condenser coolant circuit 26.

When the ambient temperature is relatively moderate, there is a smaller temperature differential between the coolant flowing out of the RESS 12 and the ambient air. Therefore, less cooling is achieved by passing coolant in the RESS coolant circuit 24 through both the first LTR set 35 and the second LTR set 39. Therefore, the second flow path utilizes the second LTR set 39 for expelling the heat passed from the refrigerant circuit 22 to the i-condenser coolant circuit 26.

In the second flow path, the fourth valve 58 sends coolant flow from the third LTR set 43 to the second valve 54, which directs coolant flow through the second LTR set 39. The coolant flow in the i-condenser coolant circuit 26 is further cooled by the second LTR set 39. The third valve then directs coolant from the second LTR set 39 back toward the i-condenser 62 via the fourth valve 58. The second valve 54 directs coolant flow within the RESS coolant circuit 24 to the third valve 56, where it is returned to the chiller 60, which expels heat to the refrigerant circuit 22.

In one operating example illustrated by FIG. 3, where the ambient temperature is between 30 C and 38 C, and the coolant leaving the RESS 12 is approximately 40 C, the first LTR set 35 removes up to 10 kW of power from the RESS coolant circuit 24. Compare this to the 40 kW of power removed via the first LTR set 35 and the second LTR set 39 at the lower ambient temperatures that are used with the first flow path.

However, by moving the second LTR set 39 to the i-condenser coolant circuit 26, the refrigerant circuit 22 can expel more heat energy with both the second LTR set 39 and the third LTR set 43 in the i-condenser coolant circuit 26, such that the chiller 60 may remove up to 35 kW of power from the RESS coolant circuit 24. Moving the second LTR set 39 into the i-condenser coolant circuit 26 enhances the heat rejection capability of the chiller 60. Therefore, the power removal through the chiller 60 in the second flow path is greater than that of the first flow path.

When the ambient temperature is above the target high temperature, the controller 14 routes coolant flow through the third flow path, as shown in FIG. 4. The third flow path places both the first LTR set 35 and the second LTR set 39 in the i-condenser coolant circuit 26. When the ambient temperature is relatively high but still less than the temperature of the RESS 12 coolant, there is very little temperature differential between the coolant flowing out of the RESS 12 and the ambient air. Therefore, less cooling is achieved by passing coolant in the RESS coolant circuit 24 through the first LTR set 35 or the second LTR set 39.

The third flow path utilizes both the first LTR set 35 and the second LTR set 39 for expelling the heat passed from the refrigerant circuit 22 to the i-condenser coolant circuit 26. Moving the first LTR set 35 and the second LTR set 39 into the i-condenser coolant circuit 26 further enhances the heat rejection capability of the chiller 60. Therefore, the heat removal through the chiller 60 in the third flow path is greater than that of either the first flow path or the second flow path.

In one operating example illustrated by FIG. 4, where the ambient temperature is above 38 C, and the coolant leaving the RESS 12 is approximately 40 C, there is little or no temperature differential between the coolant of the RESS 12 and the ambient air such that the RESS coolant circuit 24 utilizes neither the first LTR set 35 nor the second LTR set 39 in the third flow path. When the ambient temperature is higher than the RESS 12 coolant temperature, no cooling can be achieved by passing the coolant flowing out of the RESS 12 through the first LTR set 35 and the second LTR set 39. However, the refrigerant circuit 22 can expel more heat energy with the first LTR set 35, the second LTR set 39, and the third LTR set 43 within the i-condenser coolant circuit 26, such that the chiller 60 may remove up to 40 kW of power from the RESS coolant circuit 24.

The specific operating examples discussed above relative to FIGS. 2-4 may be occur during extreme or excursion situations. For example, the coolant out temperature of the RESS 12 may reach 40 C or higher during race track, or other highly aggressive, driving situations. During the excursion situations, it may be preferred that the RESS 12 reaches temperatures no greater than 45-50 C—note that the coolant passing through the RESS 12 will be at slightly lower temperature than the RESS 12, itself, due to imperfect heat transfer therebetween.

Therefore, under racing conditions, where the coolant out temperature of the RESS 12 may reach 40 C, the controller 14 may select the flow paths according to the following: flow path 1 when the ambient temperature is below 30 C (i.e., a racing target low temperature); flow path 2 when the ambient temperature is between 30 C and 38 C (i.e., a racing target high temperature); and flow path 3 when the ambient temperature is above 38 C.

As contrasted with extreme or racing conditions, the vehicle 10 may also be used in continuous operation conditions. The continuous conditions may include mildly aggressive driving, but these conditions may generally be within the constraints of street or highway driving situations.

Under continuous driving situations, it may be preferred that the RESS 12 reaches temperatures no greater than 35 C to limit wear on the RESS 12. Therefore, the coolant out temperature of the RESS 12 may reach 30 C during continuous driving conditions. In response, the controller 14 may adjust the target low temperature and the target high temperature to better exchange heat energy with the surrounding ambient conditions.

Therefore, under continuous conditions, where the coolant out temperature of the RESS 12 may reach 30 C—due to imperfect heat transfer from the RESS 12—the controller 14 may select the flow paths according to the following: flow path 1 when the ambient temperature is below 20 C (i.e., a continuous target low temperature, which is lower than the racing target low temperature); flow path 2 when the ambient temperature is between 20 C and 28 C (i.e., a continuous target high temperature, which is lower than the racing target high temperature); and flow path 3 when the ambient temperature is above 28 C.

While varying the target low temperature and the target high temperature has been discussed herein relative to the driving conditions, particularly with an aggressiveness rating relative to either racing or continuous operation, alternative triggers may be used. For example, and without limitation, varying the target low temperature and the target high temperature may occur in response to the coolant out temperature of the RESS 12, or in response to the coolant temperature exiting the chiller 60—i.e., the coolant in temperature to the RESS 12. For example, when the coolant out temperature from the RESS 12 is 40 C, the controller 14 may use the higher target temperatures, but when the coolant out temperature from the RESS 12 is 30 C, the controller 14 may use the lower target temperatures.

Note that single, and possibly larger in size or differently configured, radiators may be used in place of the LTR sets shown. For example, and without limitation, the first radiator 32 may replace the first LTR set 35, the fourth radiator 38 may replace the second LTR set 39, and the fifth radiator 40 may replace the third LTR set 43, possibly with those single components staying in the same general location of the schematic flow patterns shown in FIGS. 2-4 and placement within the vehicle 10 shown in FIG. 1.

Furthermore, airflow through the radiators of the example vehicle 10 shown in the diagram of FIG. 1 is in series, but other configurations may be used. The ordering, or alignment, of the individual radiators shown in FIG. 1 is selected based, in part, on improved utilization of temperature differentials. For example, the third radiator 36 is located in front, relative to airflow, of the fifth radiator 40. Coolant flow through the third radiator 36 will be at a lower temperature than coolant flow through the fifth radiator 40, which is nearer to the heat transferred from the refrigerant circuit 22 to the i-condenser 62. Therefore, if the third radiator 36 raises the temperature of the airflow passing therethrough, the coolant temperature of the fifth radiator 40 will likely still have a temperature differential with the warmed air, such that heat transfer still occurs across the fifth radiator 40.

As illustrated in FIGS. 2-4, coolant flow through the first LTR set 35 is aligned in parallel, the second LTR set 39 is aligned in parallel, and the third LTR set 43 is aligned in parallel. However, this coolant flow alignment is not required. In some configurations, the LTR sets could be aligned in series. Additionally, while FIGS. 2-4 schematically illustrate the individual radiators as similar-sized boxes, the actual radiators may have very different sizes, shapes, or styles.

The detailed description and the drawings or figures are supportive and descriptive of the subject matter herein. While some of the best modes and other embodiments have been described in detail, various alternative designs, embodiments, and configurations exist.

Furthermore, any embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A method of cooling rechargeable energy storage systems (RESS) with a plurality of low temperature radiators (LTR), including a first LTR and a second LTR, that are selectively changeable between an i-condenser coolant circuit and a RESS coolant circuit, the method comprising:
comparing ambient temperature to a target low temperature and a target high temperature;
if the ambient temperature is below the target low temperature, routing coolant flow through a first flow path, wherein the first flow path places the first LTR and the second LTR in the RESS coolant circuit;
if the ambient temperature is between the target low temperature and the target high temperature, routing coolant flow through a second flow path, wherein the second flow path places the first LTR in the RESS coolant circuit and the second LTR in the i-condenser coolant circuit; and
if the ambient temperature is above the target high temperature, routing coolant flow through a third flow path, wherein the third flow path places the first LTR and the second LTR in the i-condenser coolant circuit,
wherein the plurality of LTR includes a third LTR, and passing the i-condenser coolant circuit through the third LTR,
wherein the first LTR is a first LTR set having at least two LTR,
wherein the second LTR is a second LTR set having at least two LTR,
wherein the first LTR set is aligned in parallel, and
wherein the second LTR set is aligned in parallel.

2. The method of claim 1,
wherein the third LTR is a third LTR set having at least two LTR,
wherein the first LTR set is aligned in parallel relative to coolant flow,
wherein the second LTR set is aligned in parallel relative to coolant flow, and
wherein the third LTR set is aligned in parallel relative to coolant flow.

3. The method of claim 1, further comprising:
determining a driving aggressiveness level; and
adjusting the target low temperature and the target high temperature based on the driving aggressiveness level, such that there is a racing target low temperature and a racing target high temperature, and a continuous target low temperature and a continuous target high temperature,
wherein the continuous target low temperature is lower than the racing target low temperature, and the continuous target high temperature is lower than the racing target high temperature.

4. A vehicle comprising:
a plurality of valves;
a rechargeable energy storage system (RESS);
a first low temperature radiator (LTR) set having at least two LTR;
a second LTR set having at least two LTR;
an i-condenser coolant circuit;
a RESS coolant circuit; and
a controller configured to control the valves for routing coolant flow and to compare ambient temperature to a target low temperature and a target high temperature, wherein routing coolant flow includes:
if the ambient temperature is below the target low temperature, routing coolant flow through a first flow path, wherein the first flow path places the first LTR set and the second LTR set in the RESS coolant circuit;
if the ambient temperature is between the target low temperature and the target high temperature, routing coolant flow through a second flow path, wherein the second flow path places the first LTR set in the RESS coolant circuit and the second LTR set in the i-condenser coolant circuit;

if the ambient temperature is above the target high temperature, routing coolant flow through a third flow path, wherein the third flow path places the first LTR set and the second LTR set in the i-condenser coolant circuit;

determine a driving aggressiveness level; and adjust the target low temperature and the target high temperature based on the driving aggressiveness level, such that there is a racing target low temperature and a racing target high temperature, and a continuous target low temperature and a continuous target high temperature, wherein the continuous target low temperature is lower than the racing target low temperature, and the continuous target high temperature is lower than the racing target high temperature.

5. The vehicle of claim 4, wherein the first LTR set is aligned in parallel relative to coolant flow, and wherein the second LTR set is aligned in parallel relative to coolant flow.

6. The vehicle of claim 5, further comprising:

a third LTR set having at least two LTR, wherein the third LTR set is within the i-condenser coolant circuit for the first flow path, the second flow path, and the third flow path.

7. A method of cooling rechargeable energy storage systems (RESS) with a plurality of low temperature radiators (LTR), including a first LTR and a second LTR, that are selectively changeable between an i-condenser coolant circuit and a RESS coolant circuit, the method comprising:

comparing ambient temperature to a target low temperature and a target high temperature;

if the ambient temperature is below the target low temperature, routing coolant flow through a first flow path, wherein the first flow path places the first LTR and the second LTR in the RESS coolant circuit;

if the ambient temperature is between the target low temperature and the target high temperature, routing coolant flow through a second flow path, wherein the second flow path places the first LTR in the RESS coolant circuit and the second LTR in the i-condenser coolant circuit; and if the ambient temperature is above the target high temperature, routing coolant flow through a third flow path, wherein the third flow path places the first LTR and the second LTR in the i-condenser coolant circuit, wherein the first LTR is a first LTR set having at least two LTR, wherein the second LTR is a second LTR set having at least two LTR, wherein the first LTR set is aligned in parallel, and wherein the second LTR set is aligned in parallel.

8. The method of claim 7, further comprising:

determining a driving aggressiveness level; and adjusting the target low temperature and the target high temperature based on the driving aggressiveness level, such that there is a racing target low temperature and a racing target high temperature, and a continuous target low temperature and a continuous target high temperature, wherein the continuous target low temperature is lower than the racing target low temperature, and the continuous target high temperature is lower than the racing target high temperature.

9. The method of claim 8, wherein the plurality of LTR includes a third LTR and the third LTR is a third LTR set having at least two LTR, and passing the i-condenser coolant circuit through the third LTR;

wherein the first LTR set is aligned in parallel relative to coolant flow;

wherein the second LTR set is aligned in parallel relative to coolant flow; and wherein the third LTR set is aligned in parallel relative to coolant flow.

* * * * *